J. B. Fisher,
Mortising Chisel,
№ 22,863. Patented Feb. 8, 1859.

Witnesses:
L. Merrill
John Dexter

Inventor:
J. B. Fisher

UNITED STATES PATENT OFFICE.

J. B. FISHER, OF BEAVER DAM, WISCONSIN.

MORTISING-CHISEL.

Specification of Letters Patent No. 22,863, dated February 8, 1859.

*To all whom it may concern:*

Be it known that I, J. B. FISHER, of Beaver Dam, in the county of Dodge and State of Wisconsin, have invented a new and useful Improvement in Tools for Mortising-Machines; and I do hereby declare that the following is a full, clear, and exact description of the same, reference being had to the annexed drawings, making a part of this specification, in which—

Figure 1:
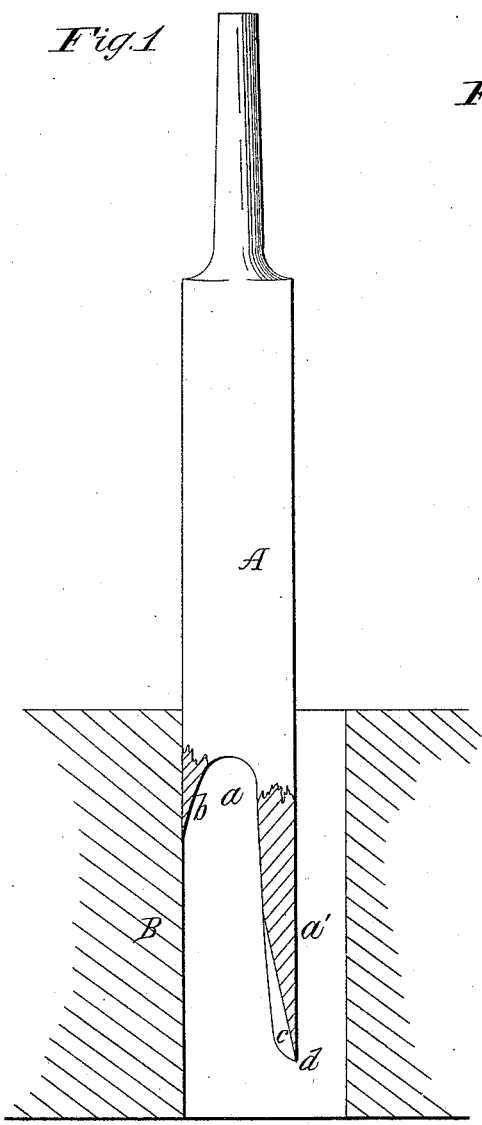
Figure 2:
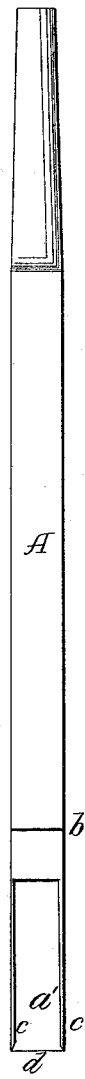

Figure 1, is a side view of my improvement the lower part comprising the cutters, being bisected vertically. Fig. 2 is an edge view of ditto.

Similar letters of reference indicate corresponding parts in the two figures.

This invention consists in forming the tool with the cutting edges at one end, one cutting portion being considerably shorter than the other, and so arranged that mortises may be cut without the necessity of reversing the tool, and the chips effectually discharged from the mortises by the action of the tool.

To enable those skilled in the art to fully understand and construct my invention I will proceed to describe it.

A, represents a bar of quadrilateral form the lower end of which, if not the whole, is of steel. The lower end of this bar has a curved groove or recess (*a*) made in it, said groove or recess removing one side of the bar A, and penetrating upward a short distance so as to form two cutters (*a′*), (*b*), one cutter (*a′*) being considerably longer than the other (*b*), as shown clearly in Fig. 1.

The longer cutter (*a′*) is provided with a curved cutting flanch (*c*), at each side, and the lower cutting edge (*d*), is perfectly horizontal. The shorter cutter (*b*), has merely one cutting edge which is horizontal and consequently parallel with the cutting edge (*d*) of the cutter (*a′*), both cutters being equal in width to the bar A, as shown in Fig. 2.

The bevels of both cutters are at their inner sides and the two cutters are at opposite edges of the bar A, as shown clearly in Fig. 1.

The operation is as follows: The tool may be attached to any reciprocating mortising machine and during the first part of the operation the longer cutter (*a′*) performs the work, and when said cutter (*a′*) has penetrated its full depth into the "stuff" B, the cutter (*b*), entering a short distance, the "stuff" is reversed and the cutter (*a′*) cuts the mortise through at the opposite side, the cutter (*a′*) working down and forming one side of the mortise and the shorter cutter (*b*), forming the other side consequently the tool does not require to be reversed as is the case with the usual one edged cutting tool.

Another advantage my improvement possesses is that the upper edge of the recess or groove (*a*), drives the chips before it, when the "stuff" is turned and the mortise is being cut through thereby clearing the mortise of chips.

Having thus described my invention what I claim as new and desire to secure by Letters Patent is,

Constructing the tool with two cutting edges or portions (*a′*), (*b*), of different lengths substantially as herein shown and described and for the purpose set forth.

J. B. FISHER.

Witnesses:
M. G. HOWARD,
LUCIEN MERRILL.